Figure 3:
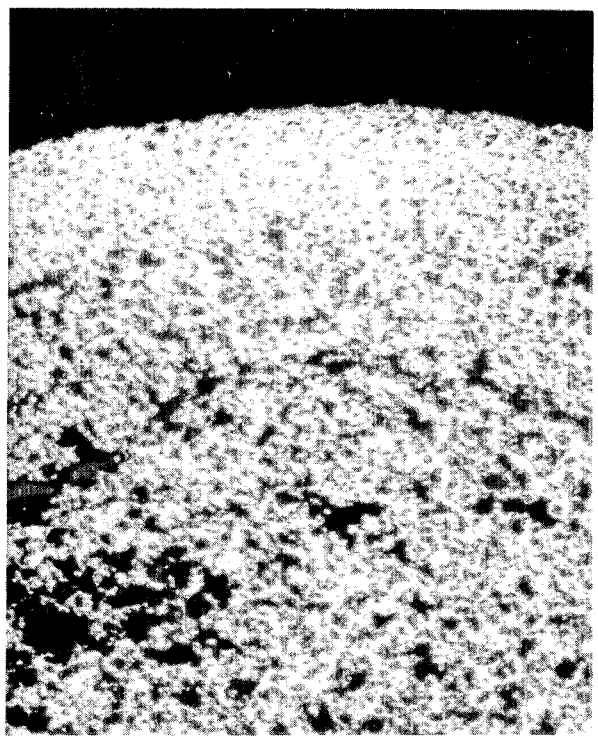

Feb. 15, 1966  R. T. SANDEN  3,235,372
HARD BURNED AGGLOMERATE AND PROCESS FOR MAKING SAME
Filed Feb. 8, 1963  2 Sheets-Sheet 1
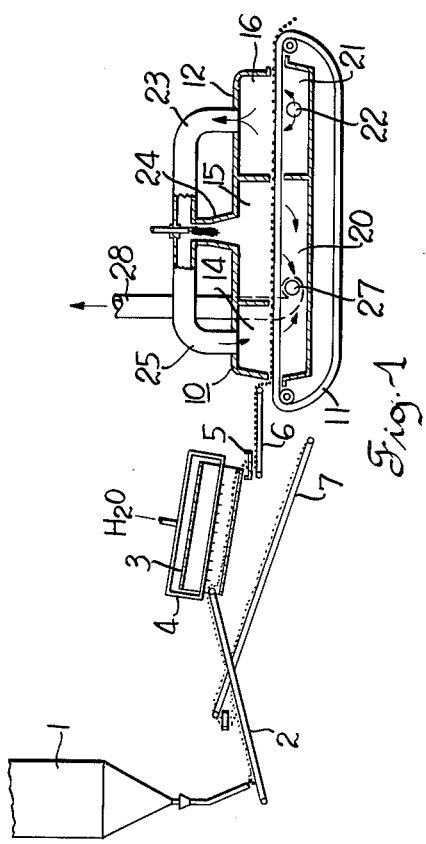
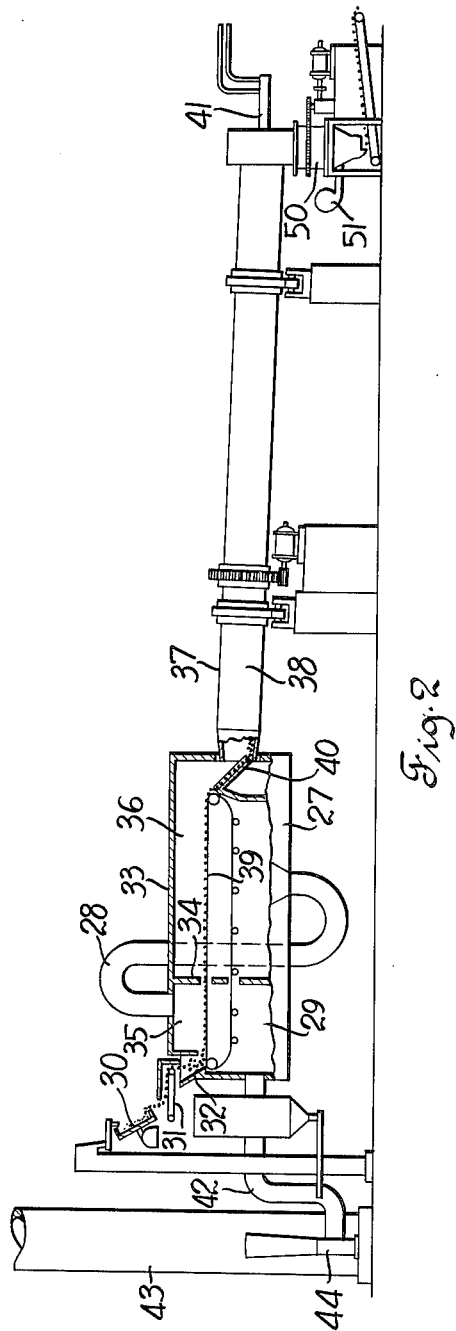
Inventor
Robert T. Sanden
By Arthur M. Streich
Attorney

United States Patent Office 3,235,372
Patented Feb. 15, 1966

3,235,372
HARD BURNED AGGLOMERATE AND PROCESS
FOR MAKING SAME
Robert T. Sanden, Milwaukee, Wis., assignor to Allis-Chalmers Manufacturing Company, Milwaukee, Wis.
Filed Feb. 8, 1963, Ser. No. 257,211
8 Claims. (Cl. 75—5)

This invention relates to an agglomerate of iron ore and flux material and methods for making such agglomerates hard and durable.

The most common way of producing metallic iron from iron ore involves charging iron ore into a blast furnace. Agglomerates are currently finding increased use as a feed to a blast furnace to avoid charging finely divided ore. The iron ore, which is an oxide of the elemental metal, is reduced to metallic iron by blowing high temperature gases through the blast furnace. Fluxing material is used to promote fusion of impurities in the ore (such as alumina, silica, etc.) and to cause the fusion to take place at a lower temperature than is required to melt such materials by themselves. This fusion is commonly referred to as slag and the term slag as it will be used herein is meant to include fused mixtures of a variety of materials found in iron ore such as compounds of the aforementioned alumina and silica as well as certain other iron compounds and other metallic compounds frequently found in iron ores. The fluxing material is usually limestone and/or dolomite.

Agglomerates or iron ore are frequently burned to give them sufficient strength to withstand handling, shipping and charging into a blast furnace. A considerable load is applied when such agglomerates are placed in a blast furnace and come under the loading pressure of a tall column of the material. The agglomerates must have considerable strength when in the blast furnace to avoid the lower layers of agglomerates being crushed by the weight of agglomerates above them, which if permitted to occur would tend to impair the passage of gases that must be blown through the charge to reduce it. Ores occurring in nature that are relatively free of fluxing material have been successfully agglomerated and burned to provide agglomerates of considerable strength that are satisfactory for charging a blast furnace. There are, however, iron ores occurring in nature that have small but relatively significant amounts of fluxing material in the ore as it is mined. It may be considered desirable to have some or even all of the fluxing material in the agglomerate when it is charged to the blast furnace. Having fluxing material in the agglomerate itself has the obvious and economically significant advantage of requiring fewer components to be fed to a blast furnace. Furthermore, having the fluxing material in the agglomerates provides a uniform distribution of flux and iron ore that can never be achieved by charging alternate layers of iron ore and fluxing material into a blast furnace.

Early approaches to hardening an agglomerate of iron ore and flux by exposing the agglomerates to very high temperature gases were not entirely satisfactory because the agglomerates tended to weep liquid slag when burned.

It was proposed, in a manner described and claimed in copending patent applications of Eugene W. Price, S.N. 143,096, filed October 5, 1961, now Patent No. 3,169,852 and Glenn M. Hanson et al., S.N. 143,097, filed October 5, 1961, now Patent No. 3,163,519, to provide pellets having all of their flux in a core surrounded by a coat of flux free ore. Such pellets eliminated the difficulties encountered by weeping. However, making such pellets requires a primary rolling operation to make the cores, followed by a reroll to apply the coat.

According to this invention an agglomerate containing flux is preburned in an oxidizing atmosphere. Preburning as the term will be used in the description to follow means to heat agglomerates of iron ore in an oxidizing atmosphere to a temperature high enough to convert substantially all magnetite if present to hematite but below the temperatures at which liquid slag begins to form and achieve a substantial fluidity, or in other words not higher than about 2200° F. The agglomerates are kept in such a preburning atmosphere until magnetite if present substantially oxidizes to hematite and sufficient bridging grain growth does occur. For agglomerates containing flux according to the present invention, it may be preferred to preburn the agglomerates in an atmosphere of from 1800 to 2200° F. to provide a degree of strength that will permit subsequent burning of the agglomerates to a temperature high enough for liquid slag to form and combine with acid components in the agglomerates but without such slag weeping externally of the pellet to cause bunching (on a grate), ringing (in a kiln), or hanging (in a vertical shaft furnace).

The degree of agglomerate strength to be achieved and an appropriate time-temperature relation for a particular iron ore and flux, in the preburning atmosphere, may be initially determined according to this invention by one of several techniques followed by necessary fine adjustment (all about to be described) to insure achieving the desired end results.

One indication of sufficient preburning may be had by continuing the preburning until all $CO_2$ has been driven from the agglomerates. Another indication may be arrived at by inspection of a photomicrograph of the agglomerate. The heating in the preburning atmosphere may be allowed to proceed until a degree of grain growth is observed to have been achieved that has been determined sufficient to permit tumbling of fluxed agglomerates with substantially no breaking of whole agglomerates into pieces. A third indication may be had by performing a tumble test, actually taking a quantity of the preburned fluxed agglomerates and tumbling them to determine that the preburning has progressed sufficiently that the agglomerates can be tumbled without undue fracturing.

Following the aforesaid preburning, the agglomerates are then burned to a temperature of about 2200° F. to 2450° F. until the flux witihn the pellet is substantially calcined, combined with acid components in the agglomerate and maximum grain growth has been attained. Acid components, as the term is used, is meant to include any component more acid than lime and/or magnesia. The agglomerates may be observed from time to time during final burning, and upon any indication of slag weeping externally of the pellet (as evidenced by hanging, bunching or ringing), the calorimetric input to the agglomerates by preburning may be increased in increments until such weeping ceases. The increased heating effect in the preburning atmosphere may be by one of several approaches, such as greater time retention, increased gas flow and/or by raising the temperature of the heating gases. However, it is important that the temperature of the agglomerates is controlled so as not to rise during preburning to temperatures that cause liquid slag to form, i.e., over about 2200° F. If the preburning progresses properly according to this invention then the subsequent heating of the pellets in the burning atmosphere to higher temperatures will not then result in deleterious weeping slag.

It is a preferred practice of this invention to preburn the agglomerates on a traveling grate and to burn the agglomerates in a rotary kiln. Although suitable results may also be achieved by final burning in apparatus other than a rotary kiln, burning in a kiln provides added insurance against weeping. It has been determined that the action of tumbling in a kiln while burning, forms about the agglomerate a densified shell of bridged grains. The outer shell provides great strength and abrasion resistance which further aids in impeding weeping of slag without unduly impairing the desired permeability of the agglomerate.

Other features and achievements of the invention will appear from the following description of the invention with reference to the drawing in which:

FIG. 1 discloses a traveling grate type furnace;

FIG. 2 discloses a rotary kiln with a traveling grate preheater; and

FIG. 3 is a photomicrograph of a pellet made according to an embodiment of the invention.

Referring to FIG. 1, a hopper 1 is shown which is a storage container for a mixture of iron ore and flux. The ore and flux in hopper 1 may be funneled out at a controlled rate to a conveyer 2 that delivers this material to a balling drum 3. Balling drum 3 is mounted on an incline for rotation (by means not shown) about its central axis. A water delivery pipe 4 is provided to spray water upon finely divided ore and flux in the drum 3. The rate of feed, the slope of the drum, the rate of rotation of the drum and the quantity of water delivered in the form of a spray within the drum are the design parameters that must be coordinated to provide the desired agglomerate formation within the drum 3.

The agglomerates discharged from drum 3 are screened to provide the desired size, as for example, balls having a diameter of about ½ inch. This sizing may be accomplished by depositing the agglomerates discharged from drum 3 on a screening device 5 that delivers proper sizes to a conveyer 6 and discharges undersize to a conveyer 7. Undersize agglomerates deposited on the conveyer 7 may be recycled through the system so that this material is ultimately used in the system. Agglomerates of desired size are delivered by conveyer 6 to a furnace 10.

The treating furnace 10 shown in FIG. 1 comprises a traveling grate 11 and hood structure 12 including internal baffling means that define a drying and preburning chamber 14, a burning chamber 15 and a cooling chamber 16. Below the drying-preburning chamber 14 and burning chamber 15 is a suction chamber 20 and below the cooling chamber 16 is a wind box 21 supplied with cooling air as by a fan or blower (not shown) connected with a suitable opening 22. A conduit 23 is provided from chamber 16 with branches 24, 25 leading to the burning and drying chambers 15, 14, respectively. An opening 27 is provided in wind box 20 that leads to a conduit 28 connected to an exhaust fan (not shown).

At this point the operation of the apparatus thus far described will be summarized. A mixture of finely divided iron ore and flux material in the hopper 1 is funneled to conveyer 2. The flux material is most desirably in sufficient quantity to insure slagging the acidic components in the pellet. The conveyer 2 delivers this material to the balling drum 3. A fine spray of water, injected into balling drum 3 by the water delivery pipe 4, distributes fine droplets of moisture throughout the entire length of the balling drum. Each of these little droplets of water falling into the finely divided material delivered to drum 3 forms a tiny core that is caused to roll by the rotation of drum 3. As this tiny core rolls in the finely divided material it picks up additional material and grows to a larger and larger diameter size. The various design parameters previously referred to will have been chosen to provide an agglomerate of the desired ½ inch size. These agglomerates are discharged from the drum 3 to the screening device 5 so that those deposited upon the conveyer 6 are of nearly uniform size. The conveyer 6 deposits the thusly formed green water bound agglomerates upon the traveling grate 11 and transports them as a body with individual agglomerates at rest within the body, through the zones 14, 15 and 16. As the agglomerates pass through these zones they will be dried, preburned in an atmosphere having a temperature that may be between about 1800 to 2200 degrees Fahrenheit, then burned at a temperature in the range of 2200 degrees to 2450 degrees Fahrenheit to provide a strong pellet with the flux substantially calcined and combined with the acidic components within a network of bridged hematite grains, and finally the pellets are cooled to handling temperatures. Care must be taken that wet agglomerates are dried and preheated slowly enough that water vapor (given off during drying) and carbon dioxide gas (given off during preburning) may escape without fracturing the agglomerate. The temperature of the final treatment of the agglomerate is held to a temperature below about 2500 degrees Fahrenheit. Some iron ores reach a temperature of incipient fusion at about 2500 degrees Fahrenheit. At this temperature, if the pellet were permitted to reach it, the fluidity of the slag may increase so much as to provide an uncontained liquid phase, which is just what this invention is trying to avoid. Such a liquid state may also result in an agglomerate of low permeability and consequently more difficult to reduce in a blast furnace. According to the present invention, the agglomerates will substantially trap liquid by intergranular bridging of hematite grains, in the solid state.

The embodiment of the invention just described represents substantial and important advances in the state of this art. However, the embodiment of the inventions that will be next described represents even greater and more important advances in this art. This embodiment of the invention will be described with regard to FIGS. 2 and 3.

With reference to FIG. 2, an apparatus is shown in which a balling device 30 and a screen 31 feed agglomerates to a furnace 32. The treating furnace 32 includes structures that define three separate treating zones. Hood structure 33 and internal baffle 34 define two zones 35, 36 while a rotary kiln 37 defines the third zone numbered 38. Zone 35 is a drying zone, zone 36 a preburning zone and the third and final zone 38 is a final burning zone.

Agglomerates from the conveyer 31 are carried through the zones within the hood 33 by a gas permeable conveyer 39. The agglomerates move as a body through zones 35 and 36 with individual agglomerates being, relatively speaking, at rest within this moving body. From the conveyer 39, the agglomerates are discharged down an incline 40 and are fed into the rotary kiln 37. Agglomerates are discharged from the kiln 37 into a cooling device such as shown at 50. There are many types of cooling devices that can be used depending on the size of the installation. The cooling device 50 is of relatively simple construction and may be adequate for relatively small operations. Other well-known types of coolers will be used for large installations. The cooler 50 is shown as a rotating, vertical shaft for a downwardly moving column of agglomerates discharged from kiln 37. A blower 51 blows cooling air upwardly through the descending column to cool the agglomerates and preheat the ascending air which is admitted to the kiln 37. Agglomerates discharged from the lower end of the cooler 50 may be transported away from the installation as desired.

A burner 41 provides for a flame within the kiln 37. Hot gases proceed through the kiln 37 and the zone 38 defined therein and pass into zone 36 within the hood structure 33. From the zone 36 the hot gases are drawn downwardly through the agglomerates and the conveyer 39 into a suction box 27 below the grate. From the suction box 27 the hot gases pass through a conduit 28 to zone 35. Here the hot gases make a second pass downwardly through the agglomerates on the conveyer 39 and are collected in a second suction box 29. The hot gases pass from the second suction box 29 through a conduit 42 to a stack 43. The flow of gases may be promoted by such as an exhaust fan 44 arranged to draw gases out through conduit 42.

In the operation of the plant shown in FIG. 2 it is by proper control of the speed of the conveyer 39 that the agglomerates are dried thoroughly but at a slow enough rate that will insure water vapor having an opportunity to get out of the agglomerate without fracturing. Dry agglomerates are ready to be carried through the preburning zone 36. Within the preburning zone the temperature of the agglomerates will be raised sufficiently so that any magnetite that is present in the iron ore will convert to hematite. Such a conversion takes place at significant rates at about 1200 to 1800 degrees Fahrenheit. This transformation can be symbolically expressed by the formula $4Fe_3O_4 + O_2 \rightarrow 6Fe_2O_3$. Agglomerates entering the preburning zone 36, although dry, will have little physical strength. Sufficient physical strength must be imparted to these pellets within the preburning zone so that they can be discharged to the final burning zone where they are tumbled. The heating of particles of hematite in an oxidizing gas having a temperature over 1600 degrees Fahrenheit causes individual grains of hematite to begin to bridge together at a significant rate without any reaction with any of the available silica or flux. In order to be sure that grain growth will proceed sufficiently in the preburning zone for the agglomerate to survive subsequent tumbling at burning temperatures and without weeping liquid slag, the agglomerate may be preburned in an oxidizing atmosphere in the range of about 1800 to 2200 degrees Fahrenheit. After such preburning of the agglomerate is completed the body of agglomerates in zone 36 is disrupted and discharged into the zone 38 within the kiln 37 wherein they are tumbled during their final heat treating. The temperatures required to convert magnetite to hematite and initiate the bridging of grains to give the agglomerates sufficient strength to withstand rolling and tumbling is not quite high enough to cause the liquid phase of the slagging constituents to occur. If the rolling and tumbling of the pellets is begun before the liquid phase of the slagging constituents is reached, then the liquid phase may be very completely contained with a densified shell which can be seen in FIG. 3. FIG. 3 shows a portion of an agglomerate treated according to the described invention in a furnace such as shown in FIG. 2. The agglomerate of FIG. 3 was a ball of about ½ inch diameter. The densified shell shown in FIG. 3 measures about 1½ millimeters thick. The photomicrograph was made at a magnification of 15.

Thus, from all of the foregoing it can be seen that the inventor has made significant and important advances in this art. Many variations will perhaps occur to those skilled in the art that will be within the spirit of the inventions contributed by the inventor. It is therefore intended that the invention described should be limited only as defined in the appended claims.

The embodiments of the invention for which an exclusive property or privilege is claimed are defined as follows:

1. A method of treating iron ore and associated gangue materials containing acidic components in excess of any basic components, in which flux is homogeneously mixed with the ore to provide a basic reagent for slagging acidic components, said method comprising the steps of forming the mixture into agglomerates with the flux distributed throughout both the interior and outer surface of each agglomerate, heating the agglomerates in an oxidizing atmosphere to preburning temperature in a range above the temperature at which magnetite oxidizes to hematite and below the temperature at which a liquid slag is formed by combining the flux and acidic components, maintaining the agglomerates within said preburning temperature range until adjacent grains of hematite bridge together to form a substantially complete network of bridged hematite grains capable of acting as a barrier to egression of later formed liquid slag, then burning said agglomerates to a slagging temperature in the range of 2200 to 2450 F. and simultaneously tumbling said agglomerates to move relative to each other and to turn each agglomerate about an axis passing therethrough until said flux is substantially calcined and combined with the acidic components within a network of bridged hematite grains.

2. A method of treating iron ore and associated gangue materials containing acidic components in excess of any basic components, in which flux is homogeneously mixed with the ore to provide a basic reagent for slagging acidic components, said method comprising the steps of forming the mixture into agglomerates with the flux distributed throughout both the interior and outer surface of each agglomerate, heating the agglomerates in an oxidizing atmosphere by burning carbon fuel solely externally of the agglomerates to heat the agglomerates to preburning temperature in a range between about 1800 to 2200 degrees Fahrenheit, maintaining the agglomerates within said preburning temperature range until adjacent grains of hematite bridge together to form a substantially complete network of bridged hematite grains capable of acting as a barrier to egression of later formed liquid slag, then burning said agglomerates to a slagging temperature in the range of 2200 to 2450 degrees Fahrenheit and simultaneously tumbling said agglomerates to move relative to each other and to turn each agglomerate about an axis passing therethrough until said flux is substantially calcined and combined with the acidic components within a network of bridged hematite grains.

3. A method of treating iron ore and associated gangue materials containing acidic components in excess of any basic components, said method comprising the steps of homogeneously mixing flux with the ore in an amount sufficient for slagging all acidic components in excess of basic components in the ore, forming the mixture into agglomerates with the flux distributed throughout both the interior and outer surface of each agglomerate, heating the agglomerates in an oxidizing atmosphere to preburning temperature in a range above the temperature at which magnetite oxidizes to hematite and below the temperature at which a liquid slag is formed by combining the flux and acidic components, maintaining the agglomerates within said preburning temperature range until adjacent grains of hematite bridge together to form a substantially complete network of bridged hematite grains capable of acting as a barrier to egression of later formed liquid slag, then burning said agglomerates to a slagging temperature in the range of 2200 to 2450 degrees Fahrenheit and simultaneously tumbling said agglomerates to move relative to each other and to turn each agglomerate about an axis passing therethrough until said flux is substantially calcined and combined with the acidic components within a network of bridged hematite grains.

4. A method of treating iron ore and associated gangue materials containing acidic components in excess of any basic components, said method comprising the steps of homogeneously mixing flux with the ore in an amount sufficient for slagging all acidic components in excess of basic components in the ore, forming the mixture into agglomerates with the flux distributed throughout both the interior and outer surface of each agglomerate, heating the agglomerates in an oxidizing atmosphere by burning carbon fuel solely externally of the agglomerates to heat the agglomerates to preburning temperature in a range between about 1800 to about 2200 degrees Fahrenheit, maintaining the agglomerates within said preburning temperature range until adjacent grains of hematite bridge together to form a substantially complete network of bridged hematite grains capable of acting as a barrier to egression of later formed liquid slag, then burning said agglomerates to a slagging temperature in the range of 2200 to 2450 degrees Fahrenheit and simultaneously tumbling said agglomerates to move relative to each other and to turn each agglomerate about an axis passing therethrough until said flux is substantially calcined and combined with the acidic components within a network of bridged hematite grains.

5. A method of treating iron ore and associated gangue materials containing acidic components in excess of any basic components, in which flux is homogeneously mixed with the ore to provide a basic reagent for slagging the acidic components, said method comprising the steps of forming the mixture into agglomerates with the flux distributed throughout both the interior and outer surface of each agglomerate, heating the agglomerates in an oxidizing atmosphere to preburning temperature in a range above the temperature at which magnetite oxidizes to hematite and below the temperature at which a liquid slag is formed by combining the flux and acidic components, maintaining the agglomerates within said preburning temperature range until adjacent grains of hematite bridge together to form a substantially complete network of bridged hematite grains capable of acting as a barrier to egression of later formed liquid slag, then tumbling said agglomerates along a generally horizontal inclined path while burning said agglomerates to a slagging temperature in the range of 2200 to 2450-degrees Fahrenheit until said flux is substantially calcined and combined with the acidic components within a network of bridged hematite grains.

6. A method of treating iron ore and associated gangue materials containing acidic components in excess of any basic components, in which flux is homogeneously mixed with the ore to provide a basic reagent for slagging the acidic components, said method comprising the steps of forming the mixture into agglomerates with the flux distributed throughout both the interior and outer surface of each agglomerate, heating the agglomerates in an oxidizing atmosphere by burning carbon fuel solely externally of the agglomerates to heat the agglomerates to preburning temperature in a range between about 1800 to about 2200 degrees Fahrenheit, maintaining the agglomerates within said preburning temperature range until adjacent grain of hematite bridge together to form a substantially complete network of bridged hematite grains capable of acting as a barrier to egression of later formed liquid slag then tumbling said agglomerates along a generally horizontal inclined path while burning said agglomerates to a slagging temperature in the range of 2200 to 2450 degrees Fahrenhit until said flux is substantially calcined and combined with the acidic components within a network of bridged hematite grains.

7. A method of treating iron ore and associated gangue materials containing acidic components in excess of any basic components, said method comprising the steps of homogeneously mixing flux with the ore in an amount sufficient for slagging all acidic components in excess of basic components in the ore, forming the mixture into agglomerates with the flux distributed throughout both the interior and outer surface of each agglomerate, heating the agglomerates in an oxidizing atmosphere to preburning temperature in a range above the temperature at which magnetite oxidizes to hematite and below the temperature at which a liquid slag is formed by combining the flux and acidic components, maintaining the agglomerates within said preburning temperature range until adjacent grains of hematite bridge together to form a substantially complete network of bridged hematite grains capable of acting as a barrier to egression of later formed liquid slag then tumbling said agglomerates along a generally horizontal inclined path while burning said agglomerates to a slagging temperature in the range of 2200 to 2450 degrees Fahrenheit until said flux is substantially calcined and combined with the acidic components within a network of bridged hematite grains.

8. A method of treating iron ore and associated gangue materials containing acidic components in excess of any basic components, said method comprising the steps of homogeneously mixing flux with the ore in an amount sufficient for slagging all acidic components in excess of basic components in the ore, forming the mixture into agglomerates with the flux distributed throughout both the interior and outer surface of each agglomerate, heating the agglomerates in an oxidizing atmosphere by burning carbon fuel solely externally of the agglomerates to heat the agglomerates to preburning temperature in a range between about 1800 to about 2200 degrees Fahrenheit, maintaining the agglomerates within said preburning temperature range until adjacent grains of hematite bridge together to form a substantially complete network of bridged hematite grains capable of acting as a barrier to egression of later formed liquid slag then tumbling said agglomerates along a generally horizontal inclined path while burning said agglomerates to a slagging temperature in the range of 2200 to 2450 degrees Fahrenheit until said flux is substantially calcined and combined with the acidic components within a network of bridged hematite grains.

References Cited by the Examiner

UNITED STATES PATENTS

| | | | |
|---|---|---|---|
| 2,750,272 | 6/1956 | Lellep | 75—3 |
| 2,750,274 | 6/1956 | Lellep | 75—5 |
| 2,806,776 | 9/1957 | Veal et al. | 75—5 |
| 2,816,016 | 12/1957 | De Vaney | 75—5 |
| 2,925,336 | 2/1960 | Stowasser | 75—3 |
| 2,990,268 | 6/1961 | De Vaney | 75—5 |
| 3,003,864 | 10/1961 | Kraver et al. | 75—5 |
| 3,088,723 | 5/1963 | Haley et al. | 75—5 |
| 3,163,519 | 12/1964 | Hanson et al. | 75—5 |

BENJAMIN HENKIN, *Primary Examiner.*